United States Patent
Hanley et al.

(10) Patent No.: US 10,548,085 B2
(45) Date of Patent: Jan. 28, 2020

(54) OPTIMIZATION OF BROADCAST MESSAGING FOR LOW-ENERGY DEVICES COMMUNICATING WITH A NODE ON A TIME-SLOTTED CHANNEL HOPPING NETWORK

(71) Applicant: Landis+Gyr Innovations, Inc., Alpharetta, GA (US)

(72) Inventors: James Patrick Hanley, Decatur, GA (US); Vidya Prakash, Alpharetta, GA (US); Christopher Scott Hett, Smyrna, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 141 days.

(21) Appl. No.: 15/348,308

(22) Filed: Nov. 10, 2016

(65) Prior Publication Data
US 2018/0132182 A1  May 10, 2018

(51) Int. Cl.
*H04W 52/02* (2009.01)
*H04W 72/00* (2009.01)
*H04W 72/04* (2009.01)

(52) U.S. Cl.
CPC ..... *H04W 52/0235* (2013.01); *H04W 72/005* (2013.01); *H04W 72/0446* (2013.01)

(58) Field of Classification Search
CPC ........... H04W 52/0235; H04W 72/005; H04W 72/0446
See application file for complete search history.

(56) References Cited

U.S. PATENT DOCUMENTS

| 6,826,408 B1* | 11/2004 | Kim | H04W 4/06 455/466 |
| 2011/0176520 A1* | 7/2011 | Patel | H04B 13/005 370/336 |

(Continued)

FOREIGN PATENT DOCUMENTS

| KR | 1020120061741 | 6/2012 |
| WO | 2007092424 | 8/2007 |

OTHER PUBLICATIONS

The Evolution of MAC Protocols in Wireless Sensor Networks: A Survey; Pei Huang, Li Xiao, Senior Member, IEEE, Soroor Soltani, Student Member, IEEE, Matt W. Mutka, and Ning Xi, Fellow, IEEE; IEEE Communications Surveys & Tutorials, vol. 15, No. 1, First Quarter 2013 (Year: 2013).*

(Continued)

*Primary Examiner* — Hassan Kizou
*Assistant Examiner* — Deepa Belur
(74) *Attorney, Agent, or Firm* — Kilpatrick Townsend & Stockton LLP

(57) ABSTRACT

Systems and methods optimize broadcast transmissions from a parent device operating on a time-slotted channel hopping (TSCH) network to one or more low-energy endpoint devices connected and synchronized to the communications of the TSCH parent device. As part of a Receiver Initiated Transmit (RIT) communication process, the TSCH parent device receives a check-in communication from a connected low-energy endpoint device during a wake state of a wake/sleep cycle of the low-energy endpoint device. In response to the check-in message, the TSCH parent device transmits an acknowledgment message identifying a broadcast timeslot during which the TSCH parent device will broadcast stored broadcast messages. During the identified timeslot, the TSCH parent device broadcasts stored broadcast messages to any connected low-energy endpoint (Continued)

devices that are tuned in to the corresponding frequency channel according to the TSCH protocol.

20 Claims, 9 Drawing Sheets

(56) References Cited

U.S. PATENT DOCUMENTS

| | | | | |
|---|---|---|---|---|
| 2013/0279540 | A1* | 10/2013 | Hui | H04W 72/0406 |
| | | | | 375/133 |
| 2015/0244611 | A1* | 8/2015 | VanderZee | H04L 47/17 |
| | | | | 370/338 |
| 2016/0037449 | A1* | 2/2016 | Kandhalu Raghu | |
| | | | | H04W 52/0209 |
| | | | | 370/311 |
| 2016/0134539 | A1 | 5/2016 | Hui et al. | |
| 2016/0174192 | A1* | 6/2016 | Raghu | H04W 72/1289 |
| | | | | 370/329 |
| 2016/0212740 | A1* | 7/2016 | Hui | H04W 4/06 |
| 2016/0323841 | A1* | 11/2016 | Davis | H04W 56/0015 |
| 2017/0099684 | A1* | 4/2017 | Hui | H04W 76/002 |
| 2017/0310100 | A1* | 10/2017 | VanderKoy | F24F 11/30 |
| 2018/0020447 | A1* | 1/2018 | Thubert | H04W 72/0446 |
| 2018/0077663 | A1* | 3/2018 | Davis | H04W 56/0015 |

OTHER PUBLICATIONS

International Application No. PCT/US2017/059239, International Search Report and Written Opinion dated Feb. 9, 2018, 13 pages.

* cited by examiner

OPTIMIZATION OF BROADCAST MESSAGING FOR LOW-ENERGY DEVICES COMMUNICATING WITH A NODE ON A TIME-SLOTTED CHANNEL HOPPING NETWORK

TECHNICAL FIELD

This disclosure relates generally to networking and more particularly relates to a method and system for broadcasting messages to low-energy devices communicating with a node on a time-slotted channel hopping network.

BACKGROUND

Utility companies, home automation providers, industrial automation providers, scientific and environmental application providers, and other resource providers may communicate with low powered endpoints via parent devices operating on a time-slotted channel hopping (TSCH) network, such as that defined by IEEE 802.15.4. Parent devices (e.g., electric meters, routers) are connected and communicate with each other and with the resource provider via a TSCH network, which is referred to herein as the primary network or the primary TSCH network (PN-TSCH network). Parent devices are also referred to herein as parent nodes or TSCH nodes. Parent nodes on the primary TSCH network periodically switch channel frequencies according to a channel hopping protocol.

Low-energy (LE) devices are used to monitor and/or manage consumption of resources (e.g., electricity, heat, water, other utilities, as well as other types of resources). LE devices (also referred to as LE nodes, LE endpoints, LE endpoint nodes) include, for example, battery powered devices, energy harvesting devices, and vampire tapping devices. In some aspects, LE devices can be Internet-Of-Things (IoT) enabled devices that can be used in smart power grid and smart home technologies. Low energy devices are utilized as endpoints in TSCH networks and communicate messages with A/C powered parent nodes. LE endpoints utilize a second, low energy hopping pattern in a secondary TSCH network. The secondary TSCH network utilized by the LE endpoints uses a channel hopping protocol in which channel frequencies switch at a much slower rate than the primary TSCH network used by the parent devices. The secondary TSCH network is referred to herein as a LE-TSCH network. To save on power consumption and conserve battery life, the LE-TSCH network allows LE devices to enter a sleep state (i.e. turning off or placing in a low power mode higher powered electronics such as oscillators). Upon an LE device waking from sleep, the connected parent device initiates a Receiver Initiated Transmit communication to maintain clock synchronization based on clock drift. As part of a response to the RIT communication from the parent, the connected LE device may transmit check-in messages. Upon receiving the check-in message, the connected parent device may assert that downstream messages frames are pending for the LE device.

In some instances, multiple LE devices may be connected to a parent device on the TSCH network. Parent devices may need to broadcast transmissions to all connected LE devices. Multiple LE devices connected to the parent device may operate on different wake/sleep cycles and wake up from sleep states at different times. Because LE devices may wake up and transmit check-in messages and engage in Receiver Initiated Transport communication at different times with the parent devices, parent devices may need to serially repeat broadcast packets to each LE device as it checks in. As such, there is a need for a mechanism that optimizes broadcast transmissions from parent devices to connected LE devices.

SUMMARY

Systems and methods are disclosed for optimizing broadcast transmissions from a parent device communicating on a primary time-slotted channel hopping (TSCH) network using a TSCH protocol to one or more low-energy endpoint devices (LE devices) connected to the parent device. The LE devices may be powered by a battery source and operate during wake states of a wake/sleep cycle in order to conserve battery life. In examples disclosed herein, the communications from the LE devices are synchronized with the channel hopping pattern of the TSCH protocol. The TSCH parent device stores downstream messages intended for one or more LE devices in memory while the LE devices are in a sleep state. The downstream messages may include broadcast messages for multiple LE devices. To optimize broadcast transmissions to the LE devices, the TSCH parent device broadcasts the messages by coordinating the broadcast during a timeslot the LE devices are tuned in and listening for communications from the TSCH parent device.

In one example, in response to a Receiver Initiated Transmit (RIT) message received from the TSCH parent device, the LE device transmits a check-in communication to the primary network TSCH (PN-TSCH) parent device. The LE device transmits the check-in communication on a frequency channel according to the PN-TSCH protocol. In response to the check-in communication, the PN-TSCH parent device transmits an acknowledgment message as part of the RIT process. The acknowledgment message includes an indication of a subsequent broadcast timeslot during which the PN-TSCH parent device will broadcast stored messages intended for the LE device. The PN-TSCH parent device may receive additional check-in communications from additional LE devices as they check in upon waking from sleep states. The connected LE devices may operate on different wake/sleep cycles. Accordingly, the check-in messages from respective LE devices may be received on different TSCH timeslots. During the broadcast timeslot, the PN-TSCH parent device broadcasts the broadcast message stream to any LE devices that are tuned in and listening on the frequency channel according to the channel hopping pattern utilized by the PN-TSCH parent devices. By broadcasting messages from the broadcast message queue to multiple LE devices and coordinating the broadcast with the RIT communication process, the PN-TSCH parent device reduces the need for serially transmitting the broadcast packets as repeated transmissions to each LE device as they check in.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
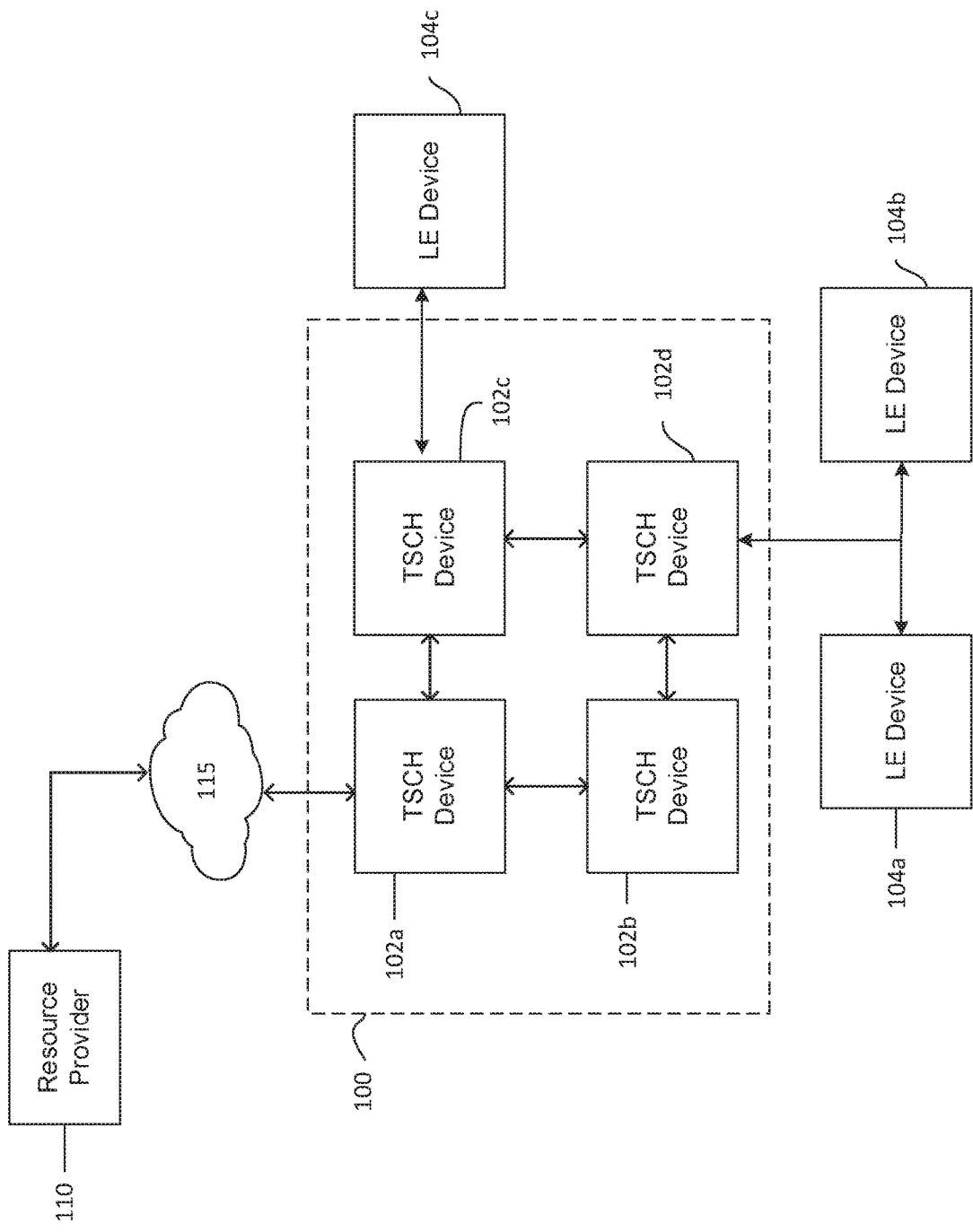
FIG. 1 is a network diagram illustrating example computing devices for implementing optimized broadcast transmissions from parent devices operating on a time-slotted channel hopping (TSCH) network to connected low-energy devices.

Systems and methods are provided for optimizing broadcast transmissions from A/C powered parent devices operating on a time-slotted channel hopping (TSCH) network to low-energy endpoint devices (LE devices) that are battery powered and synchronized to a channel hopping pattern of the TSCH network. The TSCH network used by the powered parent devices is referred to herein as a primary TSCH network, and the parent devices operating on the primary TSCH network are referred to as primary network TSCH (PN-TSCH) devices or PN-TSCH parent devices. The PN-TSCH network includes, for example, multiple PN-TSCH devices in a mesh network that provide communications with a resource provider system. The PN-TSCH devices may communicate using a TSCH protocol, such as that defined by IEEE 802.15.4. By communicating using a TSCH protocol, nodes within the PN-TSCH network transmit and receive signals using a series of time slots according to a scheduled frequency channel hopping pattern. LE devices are communicatively coupled to one or more PN-TSCH parent devices. To conserve battery life, LE devices communicate with PN-TSCH parent devices during wake periods of a wake/sleep cycle. During a sleep state, one or more components of the LE device (e.g., the transceiver, LNA, or the CPU/MPU, among other components) may be depowered or placed in a low power mode. While in a sleep state, the LE device is unable to receive messages from the parent device. During the sleep cycle, parent devices store in memory messages that are intended for a sleeping LE device. Upon waking from sleep, the PN-TSCH parent device transmits to the LE device pending messages that were stored in memory while the LE device was in a sleep state. In aspects disclosed herein, a PN-TSCH parent device may have broadcast messages intended for multiple connected LE devices. For example, in certain aspects, the firmware software operating on the LE devices may need to be upgraded. Parent devices may need to transmit a broadcast communication carrying an over-the-air firmware software update to multiple connected LE devices. To avoid having to serially broadcast the communication to each LE device individually as it checks in, the parent device coordinates transmission of broadcast messages with the Receiver Initiated Transmit (RIT) communications with the connected LE devices.

For example, an RIT communication process, defined in IEEE 802.15.4e-2012, may be used to correct any clock drift that may have occurred while the connected LE device was in a sleep state and maintain clock synchronization between the PN-TSCH parent device and the connected LE device. Upon waking from a sleep state, the LE device may communicate a synchronization request message to the PN-TSCH parent device. As part of the synchronization response, the PN-TSCH parent device includes an RIT communication including the information for the LE device to synchronize its clock with the PN-TSCH parent device. Along with synchronizing the clock, the synchronization response and RIT communication allows the LE device to synchronize its communications with the channel hopping pattern used by the primary PN-TSCH network. Techniques for synchronizing communications of the LE devices with the channel hopping pattern used by the parent devices include the exchange of synchronization requests and synchronization responses between LE devices and their parent, transmission of synchronization responses from a parent without requiring a synchronization request, and broadcast of a synchronization response by a parent. The synchronization response may include synchronization data to allow the LE device to synchronize with the channel hopping pattern of the PN-TSCH network. Synchronization data may include, but is not limited to, duration of the PN-TSCH timeslots, the channel hopping pattern of the PN-TSCH network, identification of the frequency channels for each timeslot, an absolute slot number identifier. Exemplary synchronization methods are disclosed in detail in co-pending U.S. patent application Ser. No. 15/291,690, which is incorporated by reference herein.

Once synchronized with the parent device, an LE device checks in by transmitting a check-in message to the connected parent device. The check-in message allows the parent device to assert, via an acknowledgment message, if there are any stored messages intended for the LE device. In response to the check-in message, the parent transmits an acknowledgment message to the LE device. The acknowledgment message may include an indication that there are stored messages intended for the LE device that were stored while the LE device was in a sleep state. In examples disclosed herein, the acknowledgment message identifies a subsequent broadcast timeslot in the TSCH protocol during which the parent device will broadcast the stored messages. For example, the acknowledgment message may include a timeslot offset number identifying the number of subsequent timeslots in which the broadcast will be transmitted (i.e. the number of timeslots following the current timeslot). As additional LE devices wake from their respective sleep states and transmit check-in messages with the parent device in response to RIT communications, the parent device transmits respective acknowledgment messages and identifies the broadcast timeslot during which the parent device will broadcast the stored messages. During the broadcast timeslot, the multiple LE devices listen for and receive the broadcast transmission from the parent device. The parent device transmits the broadcast communication to multiple LE devices substantially simultaneously. Since the multiple LE devices are coordinated to listen for and receive the broadcast messages during a scheduled broadcast timeslot, the parent device does not need to serially transmit the broadcast messages to individual LE devices as each LE device wakes from a sleep state. Examples disclosed herein improve the channel efficiency by reducing the number of repeated transmissions from the parent device and thereby expanding the available channel bandwidth.

In additional examples, the parent device may append unicast messages to a broadcast communication and transmit unicast message frames for specific LE devices as part of the broadcast transmission. For example, parent devices may have unicast message queues building for individual LE devices while the LE devices are in sleep states. Subsequent to broadcasting the broadcast transmissions to the multiple LE devices, the parent device may piggyback unicast messages to specific LE devices. Upon receiving the unicast message frames, the LE device compares the frame destination address included in the unicast message frames with the address of the LE device. For example, the unicast message frames may include a frame destination address identifier such as an IP address or a MAC address. If the LE device determines that its address (e.g., IP address/MAC address) matches the frame destination address in the unicast message frames, the LE device continues to receive and process the unicast message. If the LE device determines that its address does not match the frame destination address, the LE device discards the received unicast message frame.

In certain examples, the PN-TSCH parent device may store messages intended for connected LE devices while the LE devices exist in a sleep state. For example, the PN-TSCH parent device may have received downstream communications intended for one or more of the connected LE devices from the resource provider system or from neighboring PN-TSCH devices. The downstream communications may comprise broadcast messages intended for multiple LE devices. The PN-TSCH parent device stores the broadcast messages in memory. In some system, the broadcast messages are stored in a broadcast message queue. Upon receiving a check-in message from an LE device as part of a response to an RIT communication, the PN-TSCH parent device determines a subsequent timeslot in the TSCH protocol as a broadcast timeslot and begins transmitting a broadcast communication that includes broadcast messages from the queue during the broadcast timeslot. In some examples, the PN-TSCH parent device is configured to determine the broadcast timeslot as a pre-determined number of timeslots subsequent to the timeslot in which the PN-TSCH parent device received the check-in communication.

These illustrative examples are given to introduce the reader to the general subject matter discussed here and are not intended to limit the scope of the disclosed concepts. The following sections describe various additional aspects and examples with reference to the drawings in which like numerals indicate like elements.

Referring now to the drawings, FIG. 1 is a network diagram illustrating an example PN-TSCH network 100 comprising PN-TSCH devices 102*a-d* communicatively coupled to a resource provider 110. The PN-TSCH network 100 provides communications between LE devices 104*a-c* and the resource provider 110 via network 115. For example, network 115 may include any suitable network or intermediary computing devices, including intranets or the Internet.

The LE devices 104*a-c* can be used to perform one or more applications relating to managing, monitoring, or otherwise using information regarding one or more attributes of a power distribution system associated with the resource provider 110. Non-limiting examples of such LE devices 104*a-c* include an intelligent metering device for monitoring and analyzing power consumption, a programmable thermostat for managing power consumption, an in-home display device for displaying information related to power consumption and associated billing information for the power consumption, and the like. LE devices 104*a-c* also include other Internet-Of-Things enabled devices for providing smart home capabilities in a home area network.

The PN-TSCH devices 102*a-c* may be powered by standard A/C power or Mains powered and may be battery backed or supercapacitor backed. In a power failure the primary TSCH network may remain operational for a duration allowable by the backup. The PN-TSCH devices 102*a-c* communicate by operating on a TSCH protocol. In contrast, the LE devices 104*a-c* are powered by a power source that is limited in the capability for sustained power usage but instead provides enough power for bursts of communication, allowing LE devices 104-*ac* to communicate for synchronization, RIT command responses, unsolicited push messages, and other burst communications. For example, LE devices 104*a-c* may be battery powered or may use other limited power sources, such as vampire tapping power and power harvesting. LE devices 104*a-c* are configured to conserve battery life/energy usage by periodically shutting down or limiting power to components (e.g., oscillators and transceivers) and thus cycle between a sleep state and a wake state. LE devices 104*a-c* communicate with each other by operating on a secondary network that utilizes a low-energy TSCH protocol. The secondary network is also referred to herein as a low-energy TSCH network (LE-TSCH network). In the LE-TSCH network, the LE devices 104*a-c* switch frequency channels at a slower rate than in the channel hopping pattern for the primary network used by the PN-TSCH devices. The LE devices 140*a-c* are communicatively coupled to PN-TSCH parent devices. For example, PN-TSCH device 102*d* is a parent device for LE devices 104*a* and 104*b*. PN-TSCH device 102*c* is a parent device for LE device 104*c*.

In aspects disclosed herein, the parent PN-TSCH devices 102*c-d* can communicate with both the neighboring PN-TSCH devices (e.g., PN-TSCH devices 102*b-c* being neighboring to PN-TSCH device 102*d* and PN-TSCH devices 102*b*, 102*d* being neighboring to PN-TSCH device 102*c*) and connected LE devices 104*a-c* via a single radio transceiver that implements more than one MAC interface.

In examples disclosed herein, the LE devices 104*a-b*, 104*c* are already synchronized with the channel hopping pattern of the PN-TSCH parent devices 102*d*, 102*c*, respectively. Any suitable technique for synchronizing communications of the LE devices 104*a-b*, 104*c* with the channel hopping pattern of parent devices 102*d*, 102*c*, which operate on a primary TSCH network, may be used. Because the LE devices 104*a-b*, 104*c* are synchronized with the channel hopping pattern of the PN-TSCH network 100, in examples disclosed herein, the LE devices 104*a-b*, 104*c* communicate with respective parent devices 104*d*, 104*c* on the corresponding frequency channels according to the PN-TSCH protocol. Further, while synchronized, the LE devices 104*a-c* switch frequency channels according to the faster channel hopping pattern of the PN-TSCH protocol (as compared to the slower channel hopping pattern of the LE-TSCH network).

Figure 2:
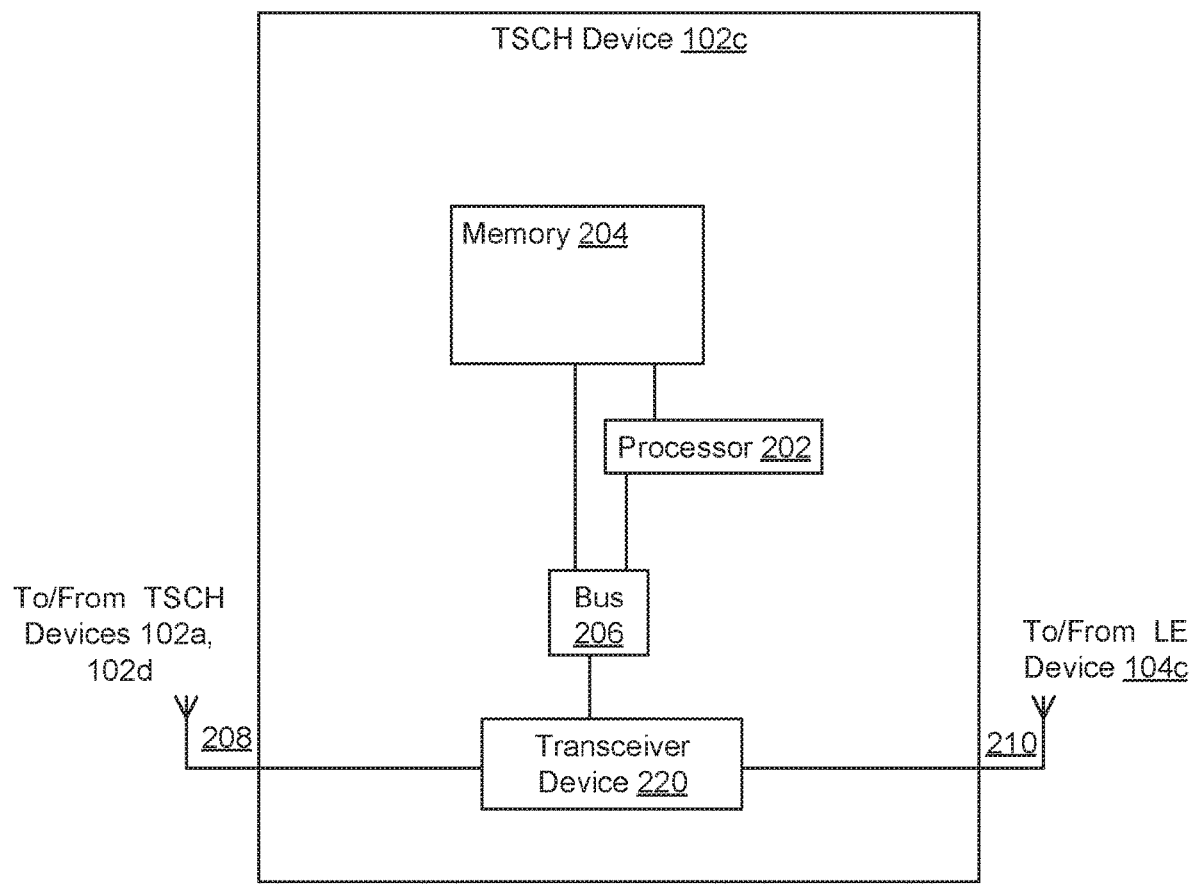
FIG. 2 is a block diagram illustrating an example of a TSCH parent device, according to examples disclosed herein.

FIG. 2 is a block diagram illustrating an example of a PN-TSCH device 102c with a single transceiver device 220 for communicating with both neighboring PN-TSCH devices and a connected LE device. The PN-TSCH device 102 includes a processor 202. Non-limiting examples of the processor 202 include a microprocessor, an application-specific integrated circuit (ASIC), a state machine, a field programmable gate array (FPGA) or other suitable processing device. The processor 202 can include any number of processing devices, including one. The processor 202 can be communicatively coupled to non-transitory computer-readable media, such as memory device 204. The processor 202 can execute computer-executable program instructions and/or access information stored in the memory device 204.

The memory device 204 can store instructions that, when executed by the processor 202, causes the processor 202 to perform operations described herein. The memory device 204 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, ActionScript, and the like.

The PN-TSCH device 102 can also include a bus 206. The bus 206 can communicatively couple one or more components of the TSCH device 102. Although the processor 202, the memory device 204, and the bus 206 are respectively depicted in FIG. 2 as separate components in communication with one another, other implementations are possible. For example, the processor 202 the memory device 204, and the bus 206 can be respective components of respective printed circuit boards or other suitable devices that can be disposed in TSCH device 102 to store and execute programming code.

The PN-TSCH device 102 also includes a transceiver device 220 communicatively coupled to the processor 202 and the memory device 204 via the bus 206. Non-limiting examples of a transceiver device 220 include an RF transceiver and other transceivers for wirelessly transmitting and receiving signals. The transceiver device 220 is capable of implementing two MAC interfaces to communicate with both neighboring PN-TSCH devices 102a, 102d and a connected LE device 104c via antennas 208, 210, respectively. While multiple antennas 208, 210 are shown for illustrative purposes, other aspects include a transceiver device 220 that can communicate with the PN-TSCH devices 102a, 102d and an LE device 104c with a single antenna. The PN-TSCH device 102 can communicate with neighboring PN-TSCH devices and the LE device 104 using a single transceiver device 220 via the same or differing network protocols. For example, the PN-TSCH device 102 can communicate with an LE device 104 configured to operate using a low-energy TSCH protocol, in which the LE device 104 switches frequency channels at a slower rate compared to the channel hopping pattern of a PN-TSCH protocol. The PN-TSCH device 102 can communicate with neighboring PN-TSCH devices using the PN-TSCH protocol via antenna 208. The TSCH device 102 may communicate with both neighboring PN-TSCH devices 102a, 102d operating on a PN-TSCH network and the LE device 104c even if the PN-TSCH device 102a, d and the LE device 104c use different frequencies.

While PN-TSCH device 102c is shown with a single transceiver device 220 for exemplary purposes, in some examples, the PN-TSCH device 102c may include multiple transceiver devices when the primary TSCH network 100 is operating on a different set of frequencies or modulation techniques than the LE device 104c. For example, a first transceiver device (configured for a first set of frequencies or modulation techniques) may be used for communication with the neighboring PN-TSCH devices 102a, 103d and a second transceiver device (configured for a second set of frequencies or modulation techniques) may be used for communication with the LE device 104c.

Figure 3:
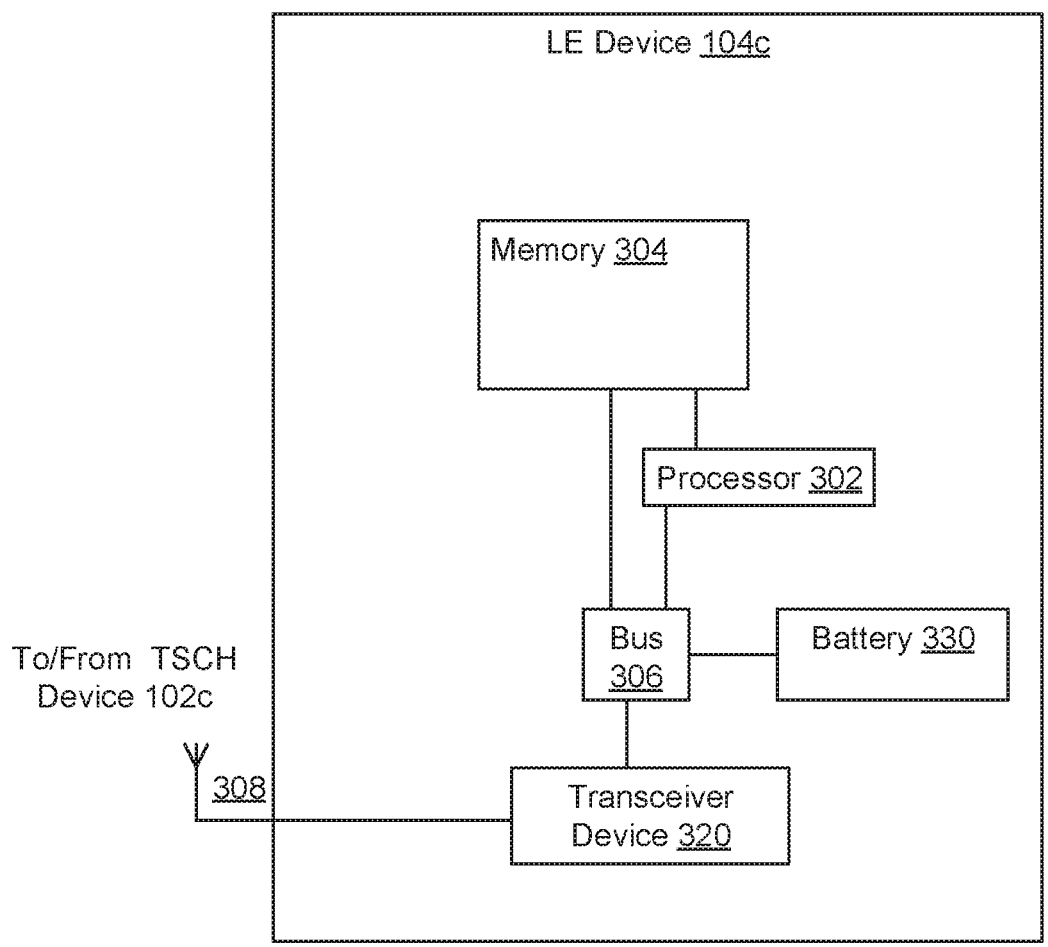
FIG. 3 is a block diagram illustrating an example of a low-energy endpoint device, according to examples disclosed herein.

FIG. 3 is a block diagram illustrating an example of an LE device 104c for communicating with parent TSCH device 102c. The LE device 104c includes a processor 302, memory 304, transceiver device 320, all interconnected via bus 306. Processor 302, memory 304, transceiver device 320, and bus 306 perform operations similar to those described above with respect to FIG. 2. The LE device 104c communicates wirelessly with PN-TSCH parent device 102c via transceiver device 320. Additionally, as LE device 104c is battery powered, the memory 304, processor 302, bus 306, and transceiver device 320 are powered by a battery 330.

Figure 4:
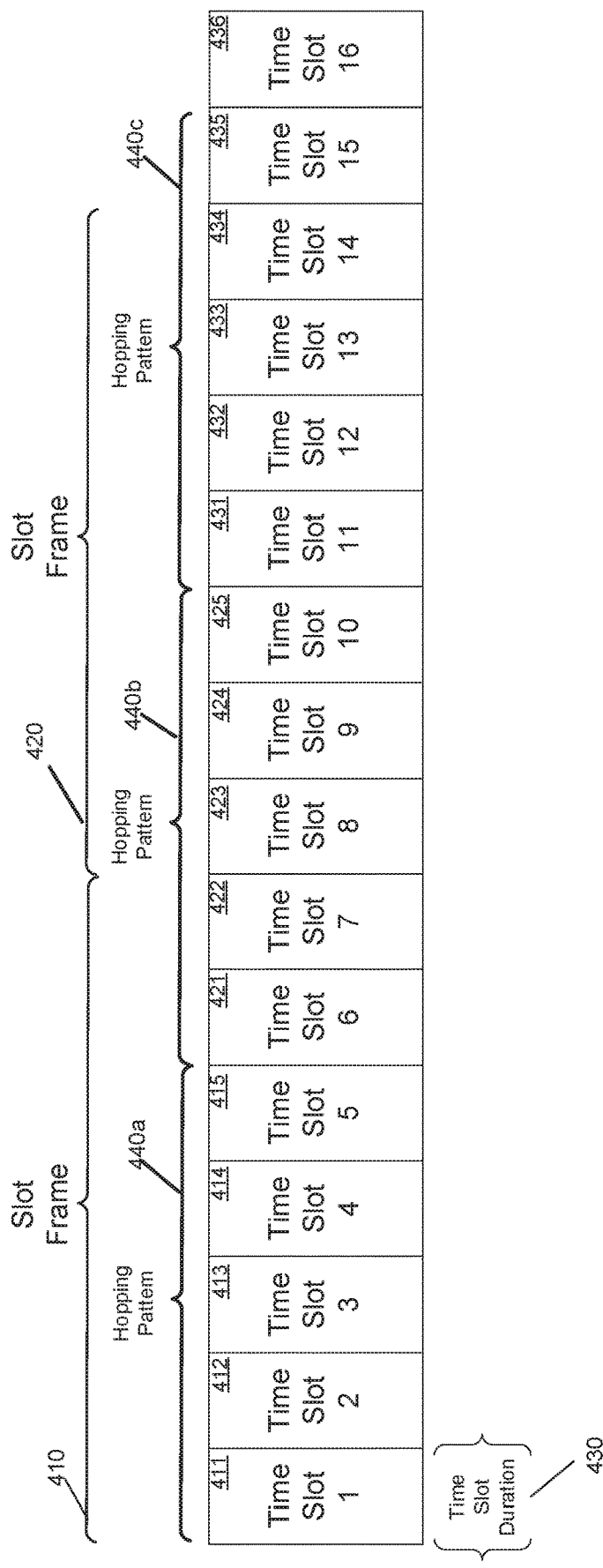
FIG. 4 is a diagram illustrating the arrangements of timeslots in a time slotted channel hopping pattern.

Each timeslot in a primary TSCH network 100 is of a time duration of duration "T" which can be defined in milliseconds or other appropriate time unit. A primary TSCH network also uses multiple channel frequencies for communication between devices in the network. A hopping pattern defines the channel used to communicate during each timeslot. FIG. 4 is a diagram illustrating timeslots and channel hopping pattern for a primary TSCH network following a TSCH protocol. FIG. 4 illustrates timeslots 411-415, 421-425, and 431-435, each with the same timeslot duration 430. As an example, timeslot duration 430 can be 25 milliseconds. Each slot frame 410 and 420 includes seven timeslots. FIG. 4 also illustrates the channel hopping pattern 440 (shown as channel hopping patterns 440a-c). A channel hopping pattern defines a channel frequency or channel for each timeslot in the hopping pattern. For example, the hopping pattern 440a may be channel 4, channel 6, channel 3, channel 5, channel 7, i.e., it may associate channel 4 with timeslot 1, channel 6 with timeslot 2, channel 3 with timeslot 3, channel 5 with timeslot 4, and channel 7 with timeslot 5. In FIG. 4 the hopping pattern 440a has a hopping pattern length of 5. The hopping pattern repeats. The first illustrated iteration of the hopping pattern 440a contains timeslots 1-5 (411-415), the second iteration of the hopping pattern 440b contains timeslots 6-10 (421-425), and the third iteration of the hopping pattern 440c contains timeslots 11-15 (431-435). The number of timeslots in a hopping pattern is independent of the number of timeslots in a slot frame.

While PN-TSCH devices 102a-d communicating using a TSCH protocol change channel frequencies every timeslot duration 430 (e.g., every 25 milliseconds), LE devices 104a-c typically operate on a low-energy TSCH protocol, where channel frequencies change at a slower rate than the channel hopping pattern of the PN-TSCH protocol. For example, LE devices 104a-c may change channel frequencies every 1,024 slot frames 410, 420. In another example, LE devices 104a-c may change channel frequencies every 1,024 timeslots (i.e. for a 25 millisecond timeslot, LE devices 104a-c may switch to a different channel every 25 seconds).

When LE devices 104a-c first join and connect to a PN-TSCH parent device 102c, 102d, the LE device 104a-c communicates the low-energy channel hopping pattern used by the LE-TSCH network to the parent device. Accordingly, the PN-TSCH parent devices 102c, 102d are able to switch to the appropriate low-energy frequency channel to communicate with the LE devices 104a for synchronization purposes. Once LE devices 104a-c wake from a sleep state, LE devices 104a-c synchronize communications with the channel hopping pattern of the PN-TSCH network 100 by communicating synchronization messages on the low-energy frequency channel used by the LE-TSCH network. Any suitable technique for synchronizing the communications of LE devices 104a-c with the channel hopping pattern of the PN-TSCH network 100 may be used, including the exemplary methods described above. By synchronizing communications between the LE device 104 and the PN-TSCH network 100 with the channel hopping protocol of the PN-TSCH network 100, the LE device 104 is able to communicate with the parent device 102 on the appropriate frequency channel according to the primary TSCH protocol. As such, once synchronized, the channel hopping rate of the LE device 104 matches the channel hopping rate of the primary TSCH network 100. In examples herein, the disclosed techniques for optimizing broadcast transmission from the PN-TSCH parent device 102 to the connected LE devices 104 may be implemented once the LE devices 104 are synchronized to the channel hopping pattern of the primary TSCH network 100.

Figure 5:
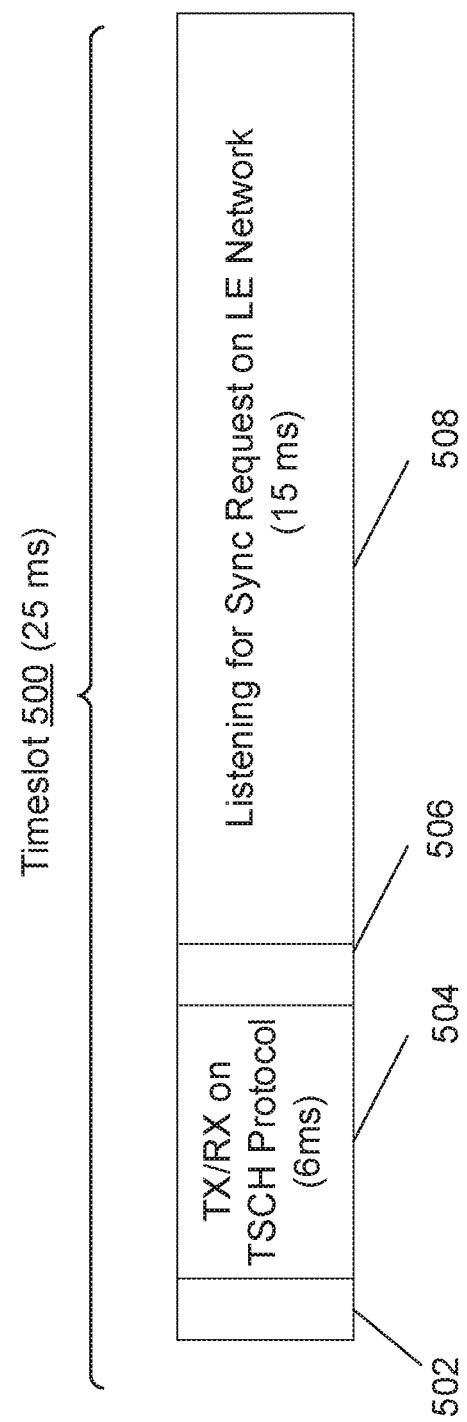
FIG. 5 is a diagram illustrating an example of one of the timeslots shown in FIG. 4.

FIG. 5 illustrates a TSCH timeslot structure for timeslot 500 according to examples herein. In this example, the time periods shown are exemplary and other values may be used in other implementations (e.g., timeslot 500 is shown with a duration of 25 milliseconds, but other periods of a timeslot are also possible). In the TSCH timeslot structure, a PN-TSCH device 102 in the PN-TSCH network communicates with neighboring PN-TSCH devices 102 or connected LE devices 104 that are synchronized with the PN-TSCH network 100 on a channel determined by the PN-TSCH hopping pattern during a primary portion of the timeslot 504. The primary portion of the timeslot 504 is shown as 6 ms for exemplary purposes, but the primary portion of the timeslot can be adjusted for other durations as well. After an RF settle period 502, the PN-TSCH device 102 can transmit or receive messages on a channel during the primary portion of the timeslot 504. If the PN-TSCH device 102 begins transmission or receipt of a message prior to the expiration of the primary portion of the timeslot 504, then the device can proceed to transmit or receive the rest of the message for the duration of the timeslot 500. If the PN-TSCH device 102 does not receive a message prior to the expiration of the primary portion of the timeslot 504, then the PN-TSCH device 102 may determine that it will not receive a communication from another device on the primary network during the present timeslot. Following an RF settle period 506, a secondary portion of the TSCH timeslot 508 is utilized for synchronizing communications between connected LE devices 104 and the channel hopping protocol of the TSCH network 100 (e.g., by listening to a synchronization request from an LE device 104 on a low-energy channel). During the secondary portion of the TSCH timeslot 508, the PN-TSCH device 102 utilizes the appropriate frequency channel used by the LE-TSCH network in order to communicate and synchronize with the LE devices 104.

Upon entering wake states from respective wake/sleep cycles, LE devices 104a-b synchronize communications with the PN-TSCH parent device 102d via a suitable method, including those described above. After communications between LE devices 104a-b and TSCH parent device 102d are synchronized, the LE devices 104a-b transmit check-in messages to the TSCH parent device 102d during the primary portion of the timeslot 504 of the TSCH protocol. The check-in messages are transmitted from the LE devices 104a-b to the PN-TSCH parent device 102d as responses to initial RIT messages that were used to synchronize the LE devices 104a-b to the PN-TSCH parent device 102d.

Figure 6:
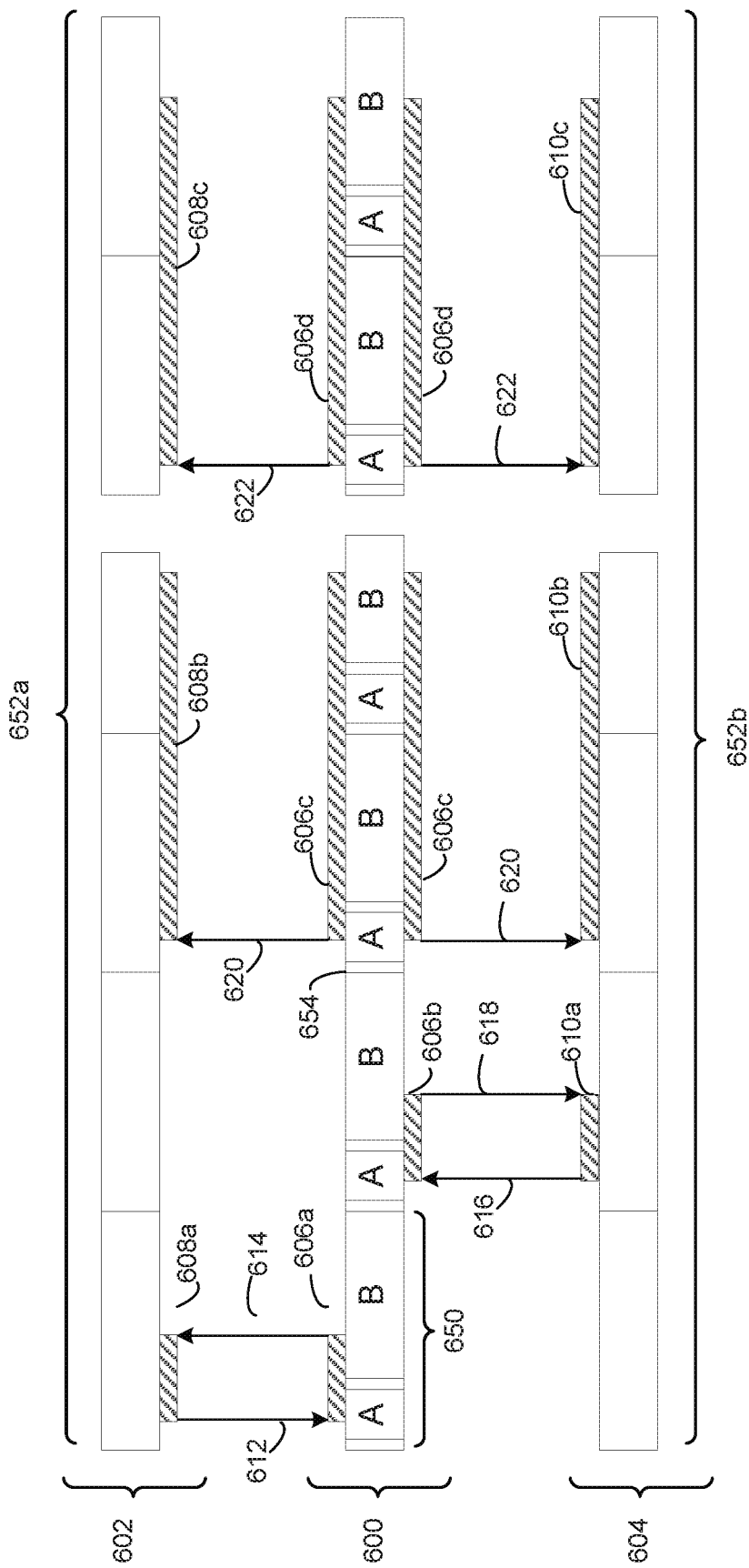
FIG. 6 is a timing diagram illustrating an example of communication between a TSCH parent device and multiple low-energy endpoint devices for coordinating broadcast transmissions with the RIT communications between the TSCH parent device and the low-energy endpoint devices.
Figure 7:
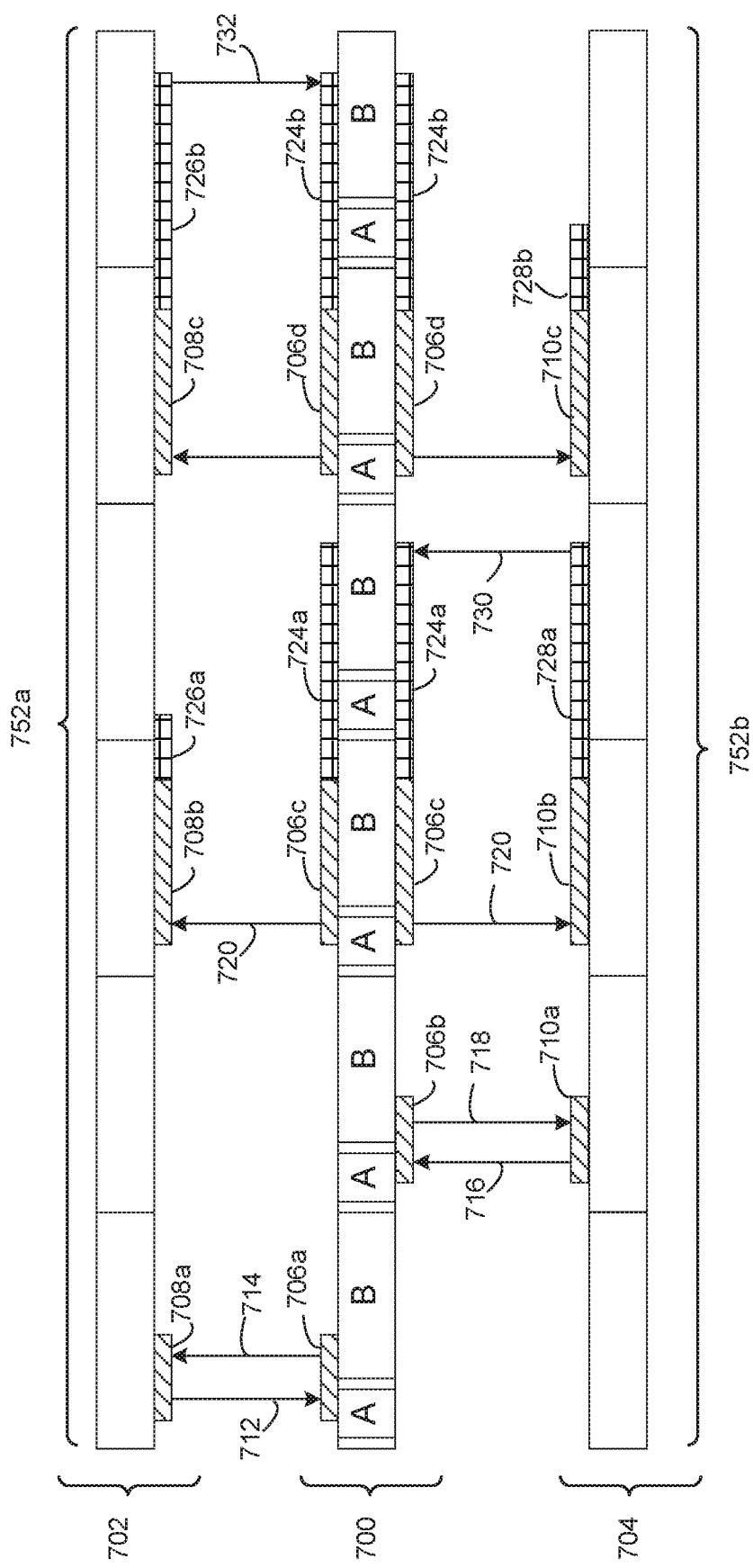
FIG. 7 is a timing diagram illustrating an example of communication between a TSCH parent device and multiple low-energy endpoint devices where the TSCH parent device appends a unicast message to a broadcast stream.

FIGS. 6-7 illustrate timing diagrams for different examples in which a parent PN-TSCH device 102 coordinates broadcast transmissions with the RIT communications with the LE devices 104. FIG. 6 depicts communication timing diagram 600 utilized by the PN-TSCH parent device 102d. Communication timing diagram 600 depicts PN-TSCH timeslots (e.g., an example shown as timeslot 650) utilized by the PN-TSCH parent device 102d. Each "A" period shown in the TSCH timeslots refer to the primary portions of the timeslots as discussed above with respect to FIG. 5. Each "B" period shown in the TSCH timeslots refer to the secondary portions of the timeslots. The examples shown in FIG. 6 further indicates that communications from the connected LE devices 104a-b are synchronized to the channel hopping pattern of the TSCH network 100. Specifically, LE device 104a communicates according to the communication timing diagram 602 and LE device 104b communicates according to the communication timing diagram 604. Both FIG. 6 and FIG. 7 depict timing diagrams where communications of the LE devices 104 are already synchronized with the PN-TSCH parent device 102d. Upon waking from sleep, the LE devices 104 may synchronize with the PN-TSCH device 102d by communicating on the "B" period of a TSCH timeslot (i.e. on a frequency channel used by the LE-TSCH network). Once synchronized, communications between the PN-TSCH device 102d and the LE devices 104 are initiated during the "A" period of a TSCH timeslot (i.e. on a frequency channel used by the PN-TSCH). As such, communication timing diagrams 602, 604 depict channel hopping patterns 652a-b that match the channel hopping pattern used by the PN-TSCH device 102d in FIG. 6. Similarly, communication timing diagrams 702, 704 depict channel hopping patterns 752a-b that match the channel hopping pattern used by the PN-TSCH device 102d in FIG. 7.

Turning to the communication between LE device 104a and PN-TSCH device 102d in FIG. 6, communication period 608a depicts the period during which LE device 104a transmits a check-in message 612 to the parent device 102d and receives an acknowledgment message from the parent device 102d. Upon waking from a sleep state and synchronizing with the parent device 102d, LE device 104a transmits a check-in message 612 to the parent PN-TSCH device 102d. The check-in message may be transmitted as a response to an RIT message from the PN-TSCH device 102d. The check-in message 612 indicates to the parent device 102d that the LE device 104a has woken from a sleep state and is checking for pending messages that may have been queued while the LE device 104a was in a sleep state. The LE device 104a transmits the check-in message 612 during the primary portion of the PN-TSCH timeslot on the frequency channel according to the channel hopping pattern utilized by PN-TSCH device 102d and the rest of the PN-TSCH network 100. The PN-TSCH parent device 102d, in response to the check-in message, transmits an acknowledgment message 614 to the LE device 104a. The acknowledgment message 614 may be transmitted on the MAC layer. If the PN-TSCH parent device 102d has a pending broadcast message stream to transmit, the acknowledgment message 614 identifies a broadcast timeslot during which the parent device 102d will broadcast the message stream.

For example, the acknowledgment message 614 may include an RIT bit as enabled (indicating that the parent device 102d has pending messages for LE device 104a) and a timeslot offset number. The timeslot offset number indicates a number of timeslots between the current timeslot and the broadcast timeslot. In the example shown in FIG. 6, the acknowledgment message 614 includes a timeslot offset number set to two. The acknowledgment message 614 thus indicates to the LE device 104a that the PN-TSCH device 102d will transmit messages intended for the LE device 104a during a broadcast timeslot that will occur two timeslots from the current timeslot. The timeslot offset numbers indicated in FIG. 6 are provided as examples and are not intended to be limiting.

Turning to the communications between LE device 104b and parent device 102d, communication period 610a depicts the period during which LE device 104b transmits a check-in message 616 to the parent device 102d and receives an acknowledgment message 618 from the parent device 102d. Similar to the communication between LE device 104a and parent device 102d, upon waking up from a sleep state and synchronizing with the parent device 102d, LE device 104b transmits a check-in message 616 to parent device 102d. The check-in message 616 may be transmitted as a response to an RIT message from the parent device 102d. As shown in FIG. 6, LE devices 104a-b connected to parent PN-TSCH device 102d may operate on different wake/sleep cycles and thus wake from sleep states during different timeslots of the TSCH protocol. In response to receiving the check-in message 616, the parent device 102d transmits the acknowledgment message 618 to the LE device 104b. To coordinate the transmission of the pending broadcast message stream with the RIT communications with the LE devices 104a-b, the parent device 102d includes, in the acknowledgment message 618, an indication of the broadcast timeslot during which the TSCH parent device 102d will broadcast the message stream.

For example, similar to the acknowledgment message 614, the acknowledgment message 618 may include an RIT bit as enabled (indicating that the parent device 102d has pending messages for LE device 104b) and a timeslot offset number. The timeslot offset number indicates a number of timeslots between the current timeslot and the broadcast timeslot. In the example shown in FIG. 6, the acknowledgment message 618 includes a timeslot offset number set to one. The acknowledgment message 618 thus indicates to the LE device 104b that the PN-TSCH device 102d will transmit messages intended for the LE device 104b during a broadcast timeslot that will occur one timeslot from the current timeslot. The timeslot offset numbers indicated in FIG. 6 are provided as examples and are not intended to be limiting.

During the broadcast timeslot (the start of the broadcast timeslot is shown at time period 654), the PN-TSCH device 102d begins the broadcast (the start of the broadcast as shown by transmission 620) by transmitting messages from the broadcast message queue to any device listening for the communication. Communication period 606c depicts the period during which PN-TSCH device 102d broadcasts broadcast message stream and communication periods 608b, 610b depict the periods during which LE devices 104a-b listen for the broadcast transmissions from the PN-TSCH device 102d. Because LE devices 104a-b were instructed, via timeslot offset numbers in the acknowledgment messages 614, 618, respectively, that the PN-TSCH device 102d will broadcast the broadcast message stream during the broadcast timeslot, the LE devices 104a-b listen for the broadcast transmissions from the PN-TSCH device 102d during the start of the broadcast timeslot. For example, LE devices 104a-b listen for communications from the PN-TSCH device 102d during the broadcast timeslot by tuning into the appropriate frequency channel on the TSCH protocol for the timeslot indicated by the PN-TSCH device 102d as the broadcast timeslot.

In some examples, instead of transmitting the entire broadcast message stream in one continuous transmission, the PN-TSCH device 102d may leave a broadcast gap and transmit the broadcast message stream via multiple broadcasts. Transmitting the broadcast message stream via multiple broadcasts allows additional LE devices to check in and receive the remaining broadcast message stream. In the example shown in FIG. 6, PN-TSCH device 102d leaves a broadcast gap and resumes transmitting the broadcast message stream during communication period 606d. The PN-TSCH device 102d can transmit, during communication period 606c as part of the broadcast messages, a timeslot offset indicating a subsequent timeslot during which the PN-TSCH device 102d will resume transmitting the broadcast message. The PN-TSCH device 102d resumes the broadcast (as shown by transmission 622) during the subsequent timeslot and LE devices 104a-b resume listening for the broadcast transmission. Communication periods 608c, 610c depict the periods during which LE devices 104a-b resume listening and receiving the broadcast transmissions from the PN-TSCH device 102d.

During the broadcast gap, additional LE devices that may be connected to the PN-TSCH device 102d may wake from sleep states and transmit check-in messages to PN-TSCH device 102d. The PN-TSCH device 102d provides acknowledgment messages to the additional LE devices, the acknowledgment messages providing an indication of the next timeslot that will be a broadcast timeslot (e.g., the start of communication period 606d). Since the additional LE devices that checked in during the broadcast gap will have missed communication period 606c, the additional LE devices may have missing blocks or data packets of information from the broadcast message stream. To obtain the missing blocks or data packets of the broadcast stream, the new LE devices can report back to the PN-TSCH parent device 102d.

For example, after the PN-TSCH parent device 102d finishes transmitting the broadcast message (i.e. subsequent to the end of the communication period 606d), the additional LE devices that checked in during a broadcast gap determine that they are missing blocks or data packets of information. The additional LE devices transmit a report message to the PN-TSCH parent device 102d identifying the missing blocks or data packets of information. The PN-TSCH parent device 102d, upon receiving an identification of the missing blocks or data packets, compiles a list of the blocks/data packets that are reported as missing across LE devices (including LE devices 104a-b and any additional LE devices that may have checked in during broadcast gaps). During a subsequent broadcast timeslot, the PN-TSCH parent device 102d may re-broadcast the missing blocks/data packets of information. If an LE device that receives the re-broadcast determines that it already received a given re-broadcasted block/data packet, the LE device may discard the duplicate information.

FIG. 7 depicts the timing diagrams for an example in which parent PN-TSCH device 102d appends unicast transmissions for specific LE devices 104a-b subsequent to broadcast transmissions for multiple LE devices 104a-b. FIG. 7 depicts communication timing diagram 700 utilized by the PN-TSCH parent device 102d. Communication timing diagram 700 depicts TSCH timeslots utilized by the PN-TSCH parent device 102d. As in FIG. 6, each "A" period shown in the TSCH timeslots refer to the primary portions of the timeslots as discussed above with respect to FIG. 5. Each "B" period shown in the TSCH timeslots refer to the secondary portions of the timeslots. The examples shown in FIG. 7 further indicates that communications from the connected LE devices 104a-b are synchronized to the channel hopping pattern of the TSCH network 100. Specifically, LE device 104a communicates according to the communication timing diagram 702 and LE device 104b communicates according to the communication timing diagram 704. As the LE devices 104a-b are synchronized with the PN-TSCH parent device 102d, communication timing diagrams 702, 704 depict channel hopping patterns 752a-b that match the channel hopping pattern used by the TSCH device 102d.

Turning to the communication between LE device 104a and PN-TSCH device 102d, communication period 708a depicts the period during which LE device 104a transmits a check-in message 712 to the parent device 102d and receives an acknowledgment message from the parent device 102d. Upon waking from a sleep state and synchronizing with the PN-TSCH device 102d, LE device 104a transmits a check-in message 712 to the parent PN-TSCH device 102d. The check-in message 712 indicates to the parent device 102d that the LE device 104a has woken from a sleep state and is checking for pending messages that may have queued while the LE device 104a was in a sleep state. The LE device 104a transmits the check-in message 712 during the primary portion of the TSCH timeslot on the frequency channel according to the channel hopping pattern utilized by the PN-TSCH device 102d and the rest of the primary TSCH network 100. The PN-TSCH parent device 102d, in response to the check-in message, transmits an acknowledgment message 714 to the LE device 104a. The acknowledgment message 714 may be transmitted on the MAC layer. If the PN-TSCH parent device 102d has a pending broadcast message stream to transmit to multiple connected LE devices 104a-b, the acknowledgment message 714 identifies a broadcast timeslot during which the parent device 102d will broadcast the message stream.

Turning to the communications between LE device 104b and parent device 102d, communication period 710a depicts the period during which LE device 104b transmits a check-in message 716 to the parent device 102d and receives an acknowledgment message 718 from the parent device 102d. Similar to the communication between LE device 104a and parent device 102d, upon wake up from a sleep state and synchronizing with the parent device 102d, LE device 104b transmits the check-in message 716 to parent device 102d. As shown in FIG. 7, LE devices 104a-b connected to parent PN-TSCH device 102d may operate on different wake/sleep cycles and thus wake from sleep states during different timeslots of the TSCH protocol. In response to receiving the check-in message 716, the parent device 102d transmits the acknowledgment message 718 to the LE device 104b. To coordinate the transmission of the pending broadcast message stream with the RIT communications of the LE devices 104a-b, the parent device 102d includes, in the acknowledgment message 718, an indication of the broadcast timeslot during which the TSCH parent device 102d will broadcast the message stream.

During the broadcast timeslot, the PN-TSCH device 102d begins the broadcast (the start of the broadcast as shown by transmission 720) by transmitting messages from the broadcast message queue to any device listening for the communication. Communication period 706c depicts the period during which PN-TSCH device 102d broadcasts broadcast message stream and communication periods 708b, 710b depict the periods during which LE devices 104a-b listen for the broadcast transmissions from the TSCH device 102d. Because LE devices 104a-b were instructed, via timeslot offset numbers in the acknowledgment messages 714, 718, respectively, that the PN-TSCH device 102d will broadcast the broadcast message stream during the broadcast timeslot, the LE devices 104a-b listen for the broadcast transmissions from the PN-TSCH device 102d during the start of the broadcast timeslot. For example, LE devices 104a-b listen for communications from the PN-TSCH device 102d during the broadcast timeslot by tuning into the appropriate frequency channel on the TSCH protocol for the timeslot indicated by the PN-TSCH device 102d as the broadcast timeslot.

While the broadcast transmission is intended for multiple connected LE devices 104a-b, the PN-TSCH device 102d may, in some implementations, append a unicast transmission to the broadcast transmission. The unicast transmission includes message data intended for a specific LE device 104, 104b. Communication period 724a depicts the period during which the PN-TSCH device 102d pauses or stops broadcasting from the broadcast message queue and transmits from a unicast message queue. While the unicast message queue may store information for a specific LE device 104a, 104b, The PN-TSCH device 102d broadcasts messages from the unicast message queue to all devices that may be listening to the communication. As LE devices 104a-b were still in the process of listening for and receiving a broadcast communication (i.e. as shown in communication periods 708b, 710b), LE devices 104a-b also receive the unicast communication during communication periods 726a, 728a. The unicast communications includes one or more unicast messages that comprise downstream message communication frames specific to an LE device 104b. The unicast communications carry a frame destination address that identifies an LE device 104b. The frame destination address can include, for example, an IP address or a MAC address identifying an LE device 104b.

As the unicast communication is broadcast from the PN-TSCH device 102d to any device listening for the communication, both LE devices 104a-b receive the initial stream of unicast messages in the broadcast. Communication periods 726a, 728a depict periods during which LE devices 104a, 104b receive unicast messages from the PN-TSCH device 102d. Upon receiving an initial packet of the unicast messages, the LE devices 104a-b determine whether the frame destination address included in the unicast message matches the address of the LE device 104a-b receiving the message. A frame destination address indicated in the unicast message that does not match the address of the receiving LE device 104a, 104b results in a frame address mismatch. If an LE device 104a, 104b determines that the frame destination address does not match its address, the LE device 104a, 104b discards the received unicast frames and stops listening for the remainder of the unicast frames. In the example shown in FIG. 7, LE device 104a identifies a frame address mismatch in the received unicast stream and thus discards the received unicast messages and stops receiving the remainder of the unicast message stream (as shown by the shorter communication period 726a for LE device 104a as compared to communication period 728a for LE device 104b). LE device 104b determines that the frame destination address in the initial received unicast message packets match the address of LE device 104b and thus continues to receive the remainder of the unicast message stream, as shown by communication period 728a. Upon receiving the unicast message stream, the LE device 104b transmits an acknowledgment message to the PN-TSCH device 102d indicating that the LE device 104b successfully received the unicast message.

In some examples, the PN-TSCH device 102d may rotate through broadcasts of different unicast message streams, each unicast message stream intended for a different LE device 104a-b. Each unicast message stream that is broadcast may be appended to a different broadcast message stream. In FIG. 7, PN-TSCH device 102d transmits, during communication period 706d, a broadcast message stream (or resumes transmitting a previously paused broadcast message stream, as explained above with respect to FIG. 6) by broadcasting the broadcast message stream to LE devices 104a-b. LE devices 104a-b listen for the broadcast message stream, as shown in communication periods 708c, 710c. While PN-TSCH device 102d appended a unicast message stream intended for LE device 104b during communication period 724a, PN-TSCH device 102d appends a second unicast message stream intended for LE device 104a during communication period 724b. As the unicast message stream is appended to the broadcast stream, the PN-TSCH device 102d transmits the unicast message stream by broadcasting the stream to any listening devices. LE devices 104a-b both receive the unicast message stream and identify if there is a frame address mismatch as discussed above. Specifically, LE device 104b receives the unicast message stream during communication period 728b. LE device 104b identifies a frame address mismatch in the message stream and accordingly discards the received unicast message communication frames that were received and stops listening for the remainder of the message. LE device 104a determines that the frame destination address in the unicast message packets match the address of LE device 104a and continues to listen for and receive the remainder of the unicast message stream during communication period 726b. Upon receiving the unicast message stream, LE device 104a transmits an acknowledgment message 732 to TSCH device 102d.

While the above examples are described in terms of appending unicast message streams to the broadcast from the PN-TSCH parent device 102d, it should be appreciated that the TSCH parent device 102d may also append multicast message streams to the broadcast in the same manner as described above with respect to unicast messages. A multicast message may include a frame destination address with the IEEE group bit set—this may be translated into an Organizationally Unique Identifier (OUI) specific group address as determined by the vendor specific applications or an Extended Unique Identifier-64 (EUI-64) address as determined by the IEEE. For example, for a PN-TSCH parent device that is broadcasting to three different LE devices, a multicast message may include frame destination address for a multicast group comprising two of the three LE devices. The PN-TSCH parent device 102d can append multicast messages at the end of a broadcast message stream. Upon receiving the multicast messages, a receiving LE device compares the frame destination address with the known multicast membership addresses of the LE device. If the frame destination address matches a multicast membership address of the LE device, the LE device continues to receive the rest of the frame, otherwise the LE device discards the received multicast message in the manner described above.

Figure 8:
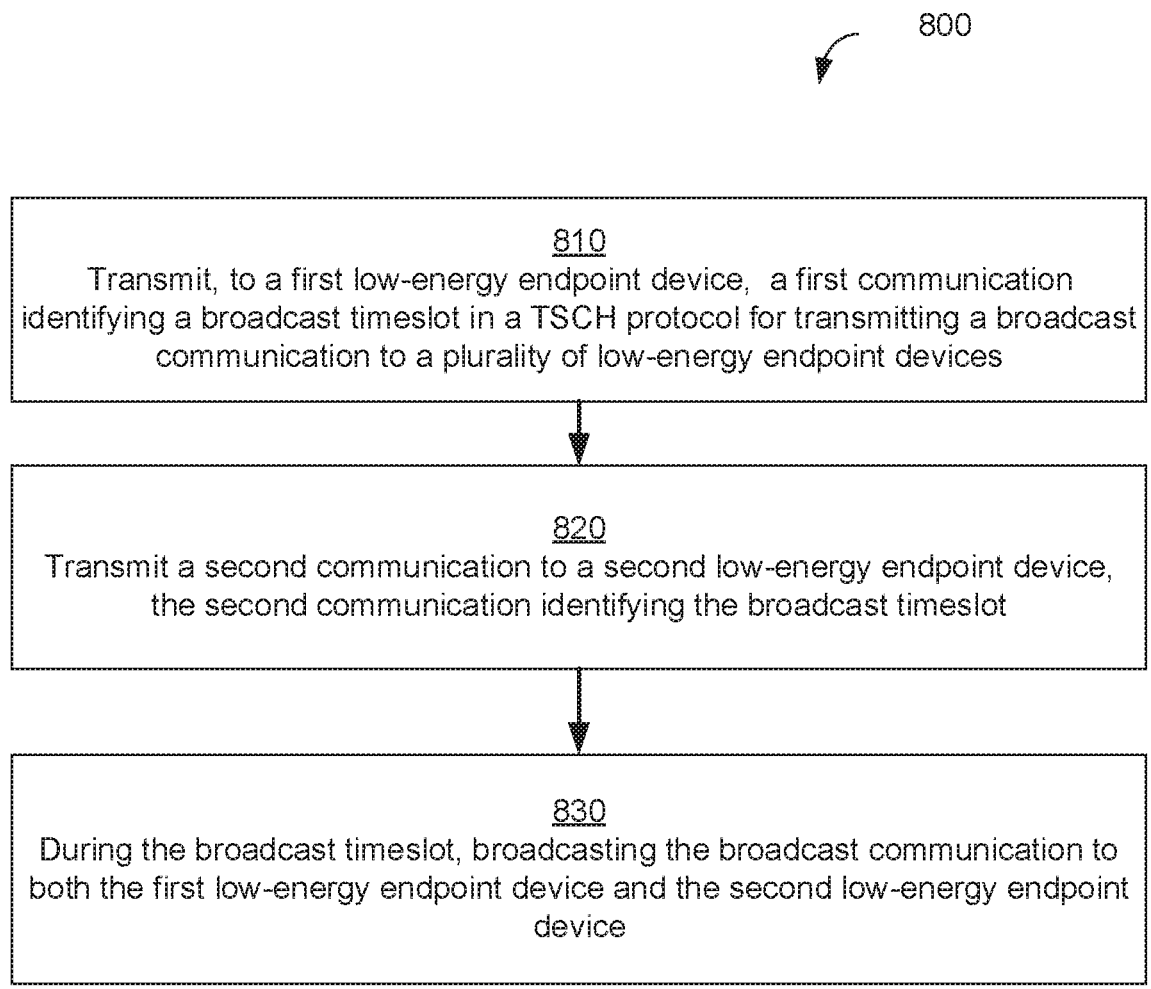
FIG. 8 is a flowchart illustrating an example process executed at a TSCH parent device for optimizing broadcast transmissions to connected low-energy endpoint devices.

FIG. 8 is a flowchart illustrating an example method 800 executed by a processor of a PN-TSCH parent device 102d for optimizing broadcast transmissions from the PN-TSCH parent device to LE devices 104a-b synchronized to the primary TSCH network. For illustrative purposes, the method 800 is described with reference to the system implementations depicted in FIGS. 1-3 and with regards to the TSCH timeslot illustrations shown in FIGS. 4-7. Other implementations, however, are possible.

As shown in block 810, the process 800 includes transmitting, during a first timeslot of a TSCH protocol from a PN-TSCH parent device 102d to a first LE device 104a, a first communication identifying a broadcast timeslot in the TSCH protocol. Because the LE device 104a is synchronized to the channel hopping pattern of the TSCH network 100, the first timeslot corresponds to a wake period of a wake/sleep cycle of the LE device 104a. The broadcast timeslot identifies the TSCH timeslot during which the parent device 102d will broadcast a broadcast communication to any LE devices 104a-b that may be listening. For example, the first communication identifying the broadcast timeslot is an acknowledgment message transmitted in response to a check-in communication received from the first LE device 104a. The check-in communication may be in response to an RIT communication transmitted from the parent device 102d, and the acknowledgment message may be part of an RIT response to the LE device 104a.

The PN-TSCH device 102d may be configured or programmed to select a subsequent timeslot in the PN-TSCH protocol as the broadcast timeslot upon receiving the check-in communication from the LE device 104a. For example, the PN-TSCH device 102d may be programmed to select a broadcast timeslot that occurs a preconfigured number of timeslots subsequent to timeslot during which the PN-TSCH device 102d received the check-in communication. By setting the broadcast timeslot as occurring later in the PN-TSCH protocol, the PN-TSCH device 102d allows for multiple LE devices 104a-b to check in before broadcasting the broadcast message stream.

The process 800 further includes transmitting, during a second timeslot of the PN-TSCH protocol, a second communication identifying the broadcast timeslot to a second LE device 104b, as shown in block 810. The step of transmitting the second communication is similar to the step described above with respect to block 810. The second LE device 104b may operate on a different wake/sleep cycle compared to the first LE device 104a. As such, the second timeslot occurs subsequent to the first timeslot and during a different channel on the channel hopping pattern of the PN-TSCH protocol.

The process 800 further includes broadcasting, during the broadcast timeslot, the broadcast communication to both the first LE device 104a and the second LE device 104b. By broadcasting the broadcast communication, the PN-TSCH device 102d provides the messages from the broadcast message queue that has been building while LE devices 104a-b were in a sleep state. The broadcast communication includes information that is intended for each of the LE devices 104a-b. For example, the broadcast communication may include firmware upgrade software for the LE devices 104a-b.

Figure 9:
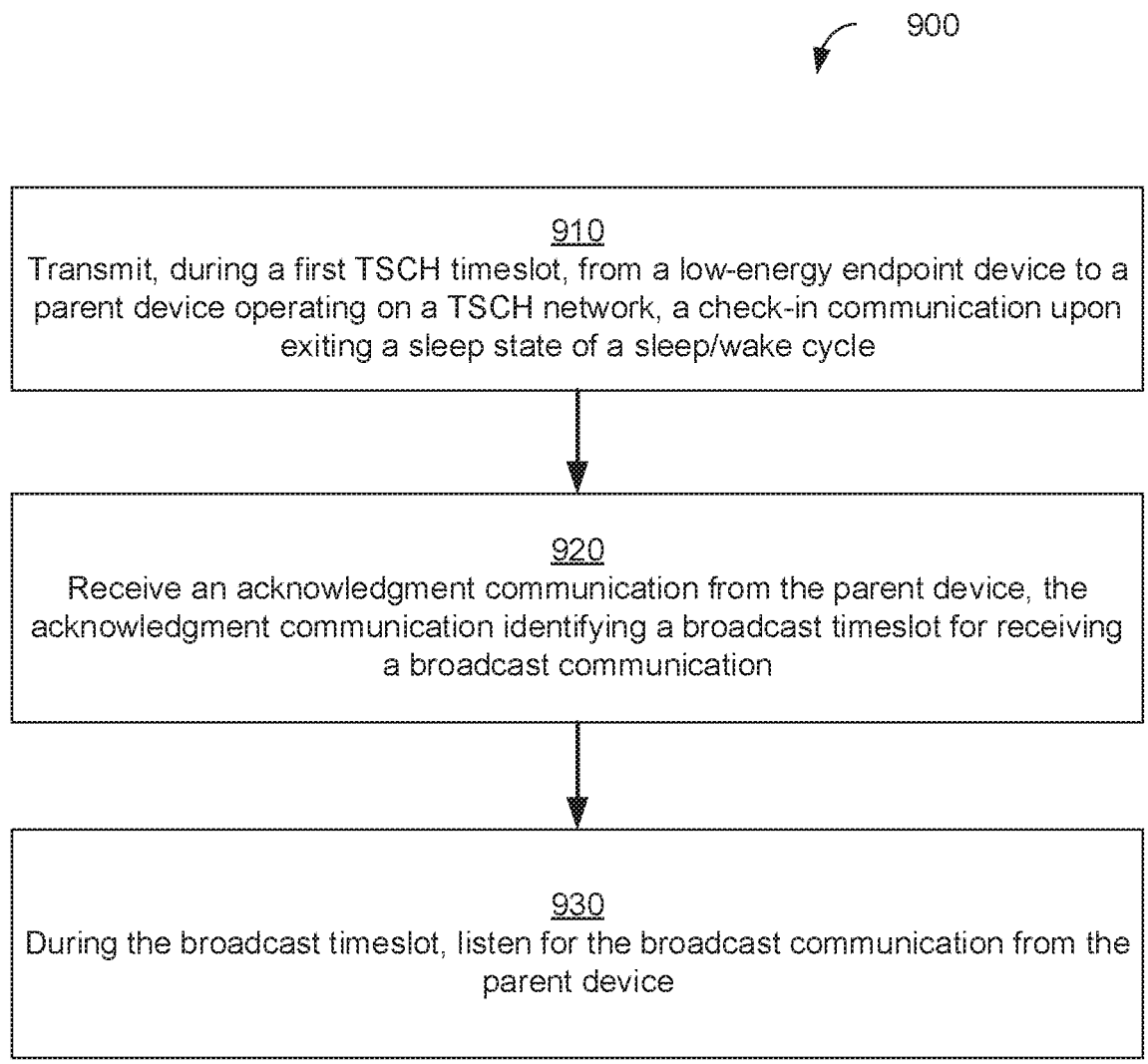
FIG. 9 is a flowchart illustrating an example process executed at a low-energy endpoint device for receiving broadcast transmissions from the TSCH parent device.

FIG. 9 is a flowchart illustrating an example method 900 executed by a processor of a LE device 104a to receive broadcast transmissions from a PN-TSCH parent device as part of the RIT communications between the LE device 104d and the PN-TSCH parent device 102d. For illustrative purposes, the method 900 is described with reference to the system implementations depicted in FIGS. 1-3 and with regards to the TSCH timeslot illustrations shown in FIGS. 4-7. Other implementations, however, are possible.

As shown in block 910, the process 900 includes transmitting, during a first timeslot of a PN-TSCH protocol and from the LE device 104a to a PN-TSCH parent device 102d, a check-in communication. The check-in communication includes a message to the parent device 102d indicating that the LE device 104a has entered a wake state and allows the parent device 102d to assert that that it has pending messages (as broadcast messages or unicast messages) for the LE device 104a. Because communications from the LE device 104a are synchronized with the channel hopping pattern of the primary TSCH network 100, the first timeslot referred to with respect to FIG. 9 corresponds to wake period of the wake/sleep cycle of the of the LE device 104a. Further, the check-in communication is transmitted during a primary portion of the first timeslot (as described above with respect to FIG. 5).

The process 900 further includes receiving, at the LE device 104a, an acknowledgment communication from the PN-TSCH parent device 102d, as shown in block 920. The PN-parent device 102d asserts that it has pending messages for the LE device 104a (i.e. as broadcast messages or unicast messages) as part of an RIT response as an acknowledgment message. The acknowledgment communication identifies a broadcast timeslot of the PN-TSCH protocol for receiving a broadcast communication. As discussed above with respect to FIG. 8, acknowledgment message may identify the broadcast timeslot via a timeslot offset number, allowing the LE device 104a to determine the subsequent timeslot in which to tune in at the appropriate frequency channel determined by the PN-TSCH protocol to receive the broadcast message.

The process 900 further includes listening for the broadcast communication from the parent device during the broadcast timeslot, as shown in block 930. For example, based on the acknowledgment message carrying a timeslot offset number 'X', the PN-TSCH device 102d identifies the broadcast timeslot as the subsequent timeslot that will occur 'X' timeslots from the timeslot in which the PN-TSCH device 102d received the acknowledgment message. Because the PN-TSCH device 102d is synchronized to the channel hopping pattern of the PN-TSCH network 100, the LE device 104a tunes in to the appropriate channel frequency as according to the PN-TSCH protocol during the broadcast timeslot. During the broadcast timeslot, the LE device 104a receives the broadcast communication from the PN-TSCH device 102d. As the broadcast transmission is broadcast from the PN-TSCH device 102d to any device listening for the communication, the broadcast transmission is received by LE device 104a and LE device 104b.

In some examples, the broadcast communication from the parent device 102d includes a first set of downstream message frames common to the multiple LE devices 104a-b and further includes a second set of downstream message frames specific to one of the LE devices 104a, 104b. The second set of message frames comprises a unicast message stream. Upon receiving the second set of message frames, LE device 104a determines whether the frame destination address included in the initial set of packets of the unicast message stream matches an address of the LE device 104a. If the frame destination address does not match the address of the LE device 104a, the LE device 104a discards the received unicast message packets. If the frame destination address matches the address of the LE device 104a, the LE device 104a continues receiving the remainder of the unicast message.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

Further, while the examples disclosed herein are described with respect to PN-TSCH devices that are A/C powered and LE devices that are battery powered, it should be understood that these examples are provided for purposes of example rather than limitation. Examples disclosed herein do not preclude use of PN-TSCH devices in a PN-TSCH network that are powered by non-A/C sources and/or LE devices that are powered by non-battery sources of power.

The invention claimed is:

1. A method executed by a processor within a parent device operating on a time-slotted channel hopping (TSCH) network, the method comprising:
   receiving, during a primary portion of a first timeslot, a check-in communication from a first low-energy endpoint device of a plurality of low-energy endpoint devices, wherein the check-in communication checks for pending messages queued at the parent device;
   in response to receiving the check-in communication from the first low-energy endpoint device, transmitting, during a secondary portion of the first timeslot of a TSCH protocol from the parent device to the first low-energy endpoint device, a first communication identifying a broadcast timeslot in the TSCH protocol subsequent to the first timeslot for transmitting a broadcast communication to the plurality of low-energy endpoint devices, the first timeslot corresponding to a first wake period of a wake/sleep cycle of the first low-energy endpoint device;
   receiving, during a primary portion of a second timeslot, a check-in communication from a second low-energy endpoint device of the plurality of low-energy endpoint devices;
   in response to receiving the check-in communication from the second low-energy endpoint device, transmitting, during a secondary portion of the second timeslot of the TSCH protocol from the parent device to the second low-energy endpoint device of the plurality of low-energy endpoint devices, a second communication identifying the broadcast timeslot, the second timeslot corresponding to a second wake period of a second wake/sleep cycle of the second low-energy endpoint device; and
   during the broadcast timeslot, broadcasting the broadcast communication to both the first low-energy endpoint device and the second low-energy endpoint device.

2. The method of claim 1, wherein the first communication is transmitted as part of a Receiver Initiated Transmit communication in response to the check-in communication from the first low energy endpoint device.

3. The method of claim 2, wherein the first communication includes a first offset number indicating a number of subsequent timeslots until the broadcast timeslot, and wherein the second communication includes a second offset number indicating a second number of subsequent timeslots until the broadcast timeslot, the second offset number less than the first offset number.

4. The method of claim 1, wherein the broadcast communication includes a common message comprising a first set of downstream message frames common to the plurality of low-energy devices, and wherein the broadcast communication further includes a unicast or multicast message comprising a second set of downstream message frames specific to the first low-energy endpoint device, the unicast or multicast message occurring subsequent to the common message.

5. The method of claim 4, wherein receipt by the second low-energy endpoint device of the unicast or multicast message causes the second low-energy endpoint device to identify a frame address mismatch in the unicast or multicast message and further causes the second low-energy endpoint device to discard the received downstream message frames specific to the first low-energy endpoint device due to the frame address mismatch.

6. The method of claim 1, wherein the broadcast communication comprises firmware upgrade software for the plurality of low-energy endpoint devices.

7. The method of claim 1, further comprising:
prior to the broadcast timeslot:
receiving, from a neighboring device operating on the TSCH network or from a resource provider system, a first broadcast message;
receiving, from the neighboring device or the resource provider system, a second broadcast message; and
storing the first broadcast message and the second broadcast message in a memory of the parent device, wherein the broadcast communication comprises the first broadcast message and the second broadcast message.

8. A method executed by a processor within a low-energy endpoint device synchronized to a channel hopping pattern of a time-slotted channel hopping (TSCH) protocol, the method comprising:
exiting a sleep state and entering a wake state of a wake/sleep cycle;
synchronizing communications with a parent device operating on the TSCH network;
after synchronizing communications with the parent device, transmitting during a primary portion of a first timeslot of the TSCH protocol, from the low-energy endpoint device to the parent device operating on the TSCH network, a check-in communication, wherein the check-in communication checks for pending messages queued at the parent device;
receiving during a secondary portion of the first timeslot, by the low-energy endpoint device, an acknowledgment communication from the parent device, the acknowledgment communication indicating that there are stored messages for the low-energy endpoint device and identifying a broadcast timeslot subsequent to the first timeslot of the TSCH protocol for receiving a broadcast communication; and
during the broadcast timeslot, listening for the broadcast communication from the parent device, wherein the broadcast communication is for a plurality of low-energy endpoint devices communicating with the parent device.

9. The method of claim 8, wherein the acknowledgment communication is received as part of a Receiver Initiated Transmit communication in response to the check-in communication, and wherein the acknowledgment communication includes an offset number identifying a number of timeslots subsequent to the first timeslot until the broadcast timeslot.

10. The method of claim 8, further comprising:
receiving the broadcast communication from the parent device, the broadcast communication comprising a first set of downstream message frames common to the plurality of low-energy endpoint devices, and wherein the broadcast communication further includes a unicast or multicast message comprising a second set of downstream message frames specific to one low-energy endpoint device of the plurality of low-energy endpoint devices;
identifying a frame destination address included in the unicast or multicast message; and
determining whether the frame destination address included in the unicast or multicast message matches an address of the low-energy endpoint device.

11. The method of claim 10, further comprising:
responsive to identifying a frame address mismatch by determining that the frame destination address does not match the address of the low-energy endpoint device, discarding the second set of downstream message frames.

12. The method of claim 10, further comprising:
responsive to determining that the frame destination address matches the address of the low-energy endpoint device, receiving an entirety of the unicast or multicast message.

13. The method of claim 8, wherein the broadcast communication comprises firmware upgrade software for the plurality of low-energy endpoint devices.

14. A system, comprising:
a plurality of devices communicatively coupled to each other in a time-slotted channel hopping (TSCH) network, at least one of the plurality of devices comprising a parent device, the parent device comprising:
a processor, and
a non-transitory computer-readable medium, wherein the processor is configured for executing instructions embodied in the non-transitory computer-readable medium to perform operations comprising:
receiving, during a primary portion of a first timeslot, a check-in communication from a first low-energy endpoint device of a plurality of low-energy endpoint devices, wherein the check-in communication checks for pending messages queued at the parent device;
in response to receiving the check-in communication from the first low-energy endpoint device, transmitting, during a secondary portion of the first timeslot of a TSCH protocol from the parent device to the first low-energy endpoint device of the plurality of low-energy endpoint devices, a first communication identifying a broadcast timeslot subsequent to the first timeslot in the TSCH protocol for transmitting a broadcast communication to the plurality of low-energy endpoint devices, the first timeslot corresponding to a first wake period of a wake/sleep cycle of the first low-energy endpoint device;

receiving a check-in communication from a second low-energy endpoint device of a plurality of low-energy endpoint devices during a primary portion of a second timeslot;

in response to receiving the check-in communication from the second low-energy endpoint device, transmitting, during a secondary portion of the second timeslot of the TSCH protocol from the parent device to the second low-energy endpoint device of the plurality of low-energy endpoint devices, a second communication identifying the broadcast timeslot, the second timeslot corresponding to a second wake period of a second wake/sleep cycle of the second low-energy endpoint device; and during the broadcast timeslot, broadcasting the broadcast communication to both the first low-energy endpoint device and the second low-energy endpoint device.

15. The system of claim 14, wherein the first communication is transmitted as part of a Receiver Initiated Transmit communication in response to the check-in communication from the first low energy endpoint device.

16. The system of claim 15, wherein the first communication includes a first offset number indicating a number of subsequent timeslots until the broadcast timeslot, and wherein the second communication includes a second offset number indicating a second number of subsequent timeslots until the broadcast timeslot, the second offset number less than the first offset number.

17. The system of claim 14, wherein the broadcast communication includes a common message comprising a first set of downstream message frames common to the plurality of low-energy devices, and wherein the broadcast communication further includes a unicast or multicast message comprising a second set of downstream message frames specific to the first low-energy endpoint device, the unicast or multicast message occurring subsequent to the common message.

18. The system of claim 17, wherein receipt by the second low-energy endpoint device of the unicast or multicast message causes the second low-energy endpoint device to identify a frame address mismatch in the unicast or multicast message and further causes the second low-energy endpoint device to discard the received downstream message frames specific to the first low-energy endpoint device due to the frame address mismatch.

19. The system of claim 14, wherein the broadcast communication comprises firmware upgrade software for the plurality of low-energy endpoint devices.

20. The system of claim 14, wherein the non-transitory computer readable medium includes instructions to perform operations further comprising:

prior to the broadcast timeslot:
receiving, from a neighboring device operating on the TSCH network or from a resource provider system, a first broadcast message;
receiving, from the neighboring device or the resource provider system, a second broadcast message; and
storing the first broadcast message and the second broadcast message in a memory of the parent device, wherein the broadcast communication comprises the first broadcast message and the second broadcast message.

* * * * *